United States Patent [19]

Ito

[11] Patent Number: 4,897,915

[45] Date of Patent: Feb. 6, 1990

[54] PROCESS FOR PRODUCING MAGNETIC HEAD OF FLOATING TYPE

[75] Inventor: Kiyotaka Ito, Daito, Japan

[73] Assignee: Sanyo Electric Co., Ltd., Osaka, Japan

[21] Appl. No.: 294,012

[22] Filed: Jan. 6, 1989

[30] Foreign Application Priority Data

Jan. 7, 1988 [JP] Japan .................................. 63-1765
Oct. 6, 1988 [JP] Japan .............................. 63-252385

[51] Int. Cl.$^4$ ............................................. G11B 5/42
[52] U.S. Cl. ................................. 29/603; 360/103; 360/129
[58] Field of Search ................. 29/603; 360/103, 129, 360/122

[56] References Cited

U.S. PATENT DOCUMENTS 3,735,052  5/1973  Hoogendoorn et al. ......... 29/603 X
3,775,571  11/1973  Case et al. ...................... 29/603 X
3,922,776  12/1975  Alger et al. ...................... 29/603

Primary Examiner—Carl E. Hall
Attorney, Agent, or Firm—Armstrong, Nikaido, Marmelstein, Kubovcik & Murray

[57] ABSTRACT

A process for producing a floating-type magnetic head comprising a head core and a slider by forming a glass layer over a core chip to cover the portion thereof to be opposed to a magnetic recording medium, and thereafter fitting the core chip into a core groove in a slider chip. The core chip is fittable into the groove without the likelihood of causing damage to the medium opposed portion since this portion is covered with the glass layer. The glass layer is melted to bond the core chip to the slider chip, and the assembly is machined to form a medium opposed face to complete the magnetic head.

4 Claims, 11 Drawing Sheets

PROCESS FOR PRODUCING MAGNETIC HEAD OF FLOATING TYPE

FIELD OF THE INVENTION

The present invention relates to a magnetic head, for example, for use in hard disc recording-reproduction apparatus useful as external memory means for electronic computers, and more particularly to a process for producing a magnetic head of the floating type which comprises a slider having faces to be opposed to recording media and a head core mounted on the slider.

BACKGROUND OF THE INVENTION

Magnetic heads of the floating type heretofore known for use with hard discs for recording or reproducing signals basically have the same construction as the magnetic head shown in FIG. 1 and to be produced by the process of the invention. The conventional magnetic head comprises a head core 1 having a magnetic gap portion 16, and a slider 2 of nonmagnetic ceramics. The head core 1 is fitted in a core accommodating groove 22 formed in the slider 2 and secured to the slider 2 by being bonded by a glass filled portion 15. As will be described later, the head core 1 is primarily made of a highly magnetic oxide, such as Mn-Zn ferrite. As seen in FIG. 2, the slider 2 having the head core 1 is formed with a pair of parallel faces 21, 21 to be opposed to a magnetic disc 3 and extending in the direction of rotation of the disc 3, with a recess 26 formed between the faces 21, 21. When the magnetic disc 3 is rotated at a high speed in the direction of arrow A, a layer of stable air current is formed between the magnetic disc 3 and the medium opposed faces 21, whereby the magnetic head is held in a floating position relative to the disc surface as specified.

As disclosed in Unexamined Japanese Publication SHO Pat. No. 62-103808, the floating-type magnetic head described is produced by the process illustrated in FIGS. 19 and 20. FIG. 19 shows a core chip 9 and a slider chip 23 which are first prepared separately. The core chip 9 comprises a pair of ferrite core segments 95, 96, with a magnetic gap portion 94 formed at a butt joint therebetween. The core chip 9 has a pair of track width defining grooves 92, 92 at opposite sides of the gap portion 94, whereby a medium opposed portion 93 is formed.

The slider chip 23 is formed, on the surface thereof to be opposed to the magnetic disc, with a pair of projections 24, 25 extending along the direction of rotation of the disc, with a recess 26 provided therebetween. The slider chip 23 has in its front portion a cutout 27 extending radially of the disc, and the above-mentioned core accommodating groove 22 extending perpendicular to the disc.

With reference to FIG. 20, the core chip 9 is then fitted into the groove 22 of the slider chip 23, and a glass rod 91 is placed on the head portion of the core chip 9. The assembly is heated in an oven to melt the glass rod 91, whereupon the molten glass flows into the clearance in the groove 22 around the core chip 9, consequently joining the core chip 9 to the slider chip 23. The projections 24, 25 are thereafter ground to a depth indicated in the broken line F in FIG. 20 and chamfered as required, whereby the same magnetic head as shown in FIG. 1 is completed.

On the other hand, in securing the core chip 9 to the slider chip 23 by melting glass, a method has been proposed which is characterized, as shown in FIG. 21, by placing glass rods 97, 97 of high softening point temperature in the respective track width defining grooves 92, 92 of the core chip 9, placing a glass rod 98 of low softening point temperature on the medium opposed portion 93, and melting at least the glass rod 98 of low softening point temperature (see Unexamined Japanese Publication SHO Pat. No. 62-189617).

In this case, the molten glass of low softening point temperature, which is highly flowable, penetrates into the clearances between the slider chip 23 and the core chip 9, and the grooves 92 and the space thereabove are filled up with the glass rods 97 of high softening point temperature and the molten glass. After the molten glass has solidified, the assembly is ground to a level indicated by the broken line G in FIG. 21 to form a medium opposed face 99 as seen in FIG. 22.

The methods shown in FIGS. 21 and 22 produce no voids in the glass filled portion between the core chip 9 and the slider chip 23, so that the head core can be firmly bonded to the slider.

However, when the core chip 9 is inserted into the groove 22 in the slider chip 23 by the conventional method as seen in FIG. 19, the medium opposed portion 93, which has a very small width (e.g., 10 to 30 micrometers) equal to the track width, of the core chip 9 is likely to collide with the slider chip 23 or the like and chip or crack at its end portion to result in a reduced yield.

Furthermore, the glass rods 91, 97 and 98 shown in FIG. 20 or 21 are as small as about 0.5 mm in diameter and are therefore difficult not only to make but also to place on the core chip or in the grooves 22, hence a poor work efficiency. With the magnetic head fabricated by the method shown in FIGS. 21 and 22, the medium opposed face 99 has greatly exposed glass portions 100 high softening point temperature, which therefore afford improved weather resistance, for example, higher moisture resistance. Nevertheless, glass portions 101 of low softening point temperature inevitably become exposed slightly, so that grinding of the medium opposed face 99 involves the problem of creating a step in this face owing to the difference in workability between the glass of low softening point temperature and the glass of high softening point temperature.

SUMMARY OF THE INVENTION

An object of the present invention is to provide a process for producing a magnetic head of the floating type wherein the core chip is fittable into a core insertion groove in the slider chip without any likelihood of causing damage to the medium opposed portion of the core chip.

Another object of the invention is to provide a process for producing a magnetic head wherein the glass filled portion can be formed more efficiently than in the prior art.

Still another object of the invention is to provide a process for producing a magnetic head wherein the core chip can be bonded to the slider chip with molten glass penetrating into every corner of the clearance therebetween to give a high bond strength and which forms a medium opposed face with glass of high softening point temperature only exposed over the face to give this face a high degree of planarity and sufficient weather resistance.

The process of the invention for producing a magnetic head includes the preparation of a core chip wherein a glass layer to be made into a glass filled portion is so formed as to cover the entire medium opposed portion of the core chip, and the core chip is thereafter fitted into a core accommodating groove in a slider chip. In this state, the glass layer is melted, causing the molten glass to penetrate into the clearance in the groove around the core chip and thereby bonding the core chip to the slider chip.

When the core chip is to be bonded to the slider chip in the present process, the medium opposed portion of the core chip is covered with the glass layer and is therefore free of the likelihood that an external impact or the like will cause damage to this portion.

The procesure for forming the glass layer comprises the first step of making track width defining grooves in the upper surface of a core block to form medium opposed portions, the second step of placing a glass plate on the medium opposed portions and melting the glass plate by heating to fill the grooves with the molten glass, and the third step of cutting the resulting core block into core chips.

Thus, the glass filled portions are formed by merely placing a single glass plate on the core block unlike the conventional practice wherein glass rods are individually placed into track width defining grooves. This method is accordingly more efficient than the conventional practice.

The glass layer to be formed over the medium opposed portion in preparing the core chip can be of a multilayer structure composed of glasses which are different in softening point temperature. In this case, the lowermost layer on the medium opposed portion is a glass layer of the lowest softening point temperature, and the softening point temperature of glass is raised gradually upward from layer to layer.

When the glass layers are heated with the core chip fitted in the core accommodating groove in the slider chip, the glass starts to melt from layer to layer upward, with the result that in the clearance in the groove around the core chip, a glass filled portion is formed which gradually increases in softening point temperature upwardly. In this step, the glass of low softening point temperature initially melted penetrates into a very small clearance between the core chip side surface and the groove defining inner surface of the slider chip to bond the chips together with improved strength.

When a medium opposed face is thereafter formed, the glass layer of high softening point temperature only becomes exposed over the face, giving this face a high degree of planarity and sufficient weather resistance.

BRIEF DESCRIPTION OF THE DRAWINGS

FIGS. 3 to 14 show stepwise a process for producing a magnetic head as a first embodiment of the invention;

FIGS. 3 (a) and (b) are perspective views showing a pair of base plates;

FIG. 4 is a perspective view showing the base plates as joined together with a gap spacer provided therebetween;

FIG. 5 is an enlarged view in section showing the same with a glass rod inserted into a winding groove;

FIG. 6 is a perspective view showing a core block obtained by cutting the pair of base plates;

FIG. 7 is a perspective view showing the core block formed with track width defining grooves;

FIG. 8 is a perspective view showing the core block with a glass plate placed thereon;

FIG. 9 is a perspective view showing the glass plate as fused to the core block;

FIG. 10 is an enlarged perspective view of a core chip obtained by cutting the core block;

FIG. 11 is a perspective view showing the core chip and a slider chip before they are assembled;

FIG. 12 is a perspective view showing the core chip as fitted in the slider chip;

FIG. 14 is an enlarged fragmentary view showing the same assembly as FIG. 13A with a core accommodating groove filled with a glass layer on melting;

FIG. 15 is a perspective view of a core block having placed thereon a glass plate of low softening point temperature and a glass plate of high softening point temperature;

FIG. 16 is a perspective view showing the two glass plates as fused to the core block;

FIG. 17 is an enlarged perspective view showing a core chip prepared from the core block and fitted in a core accommodating groove in a slider chip;

FIG. 18 is an enlarged fragmentary front view showing the core chip and the slider chip after melting and grinding;

DETAILED DESCRIPTION OF EMBODIMENTS

First Embodiment

A process for producing the floating-type magnetic head of FIG. 1 will be described with reference to FIGS. 3 to 14.

Preparing Core Chip

Figure 1:
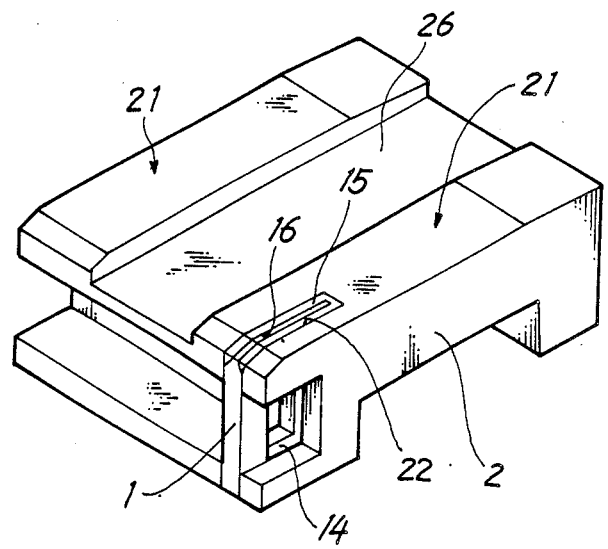
FIG. 1 is an enlarged perspective view of a magnetic head of the floating type prepared according to the invention.
Figure 2:
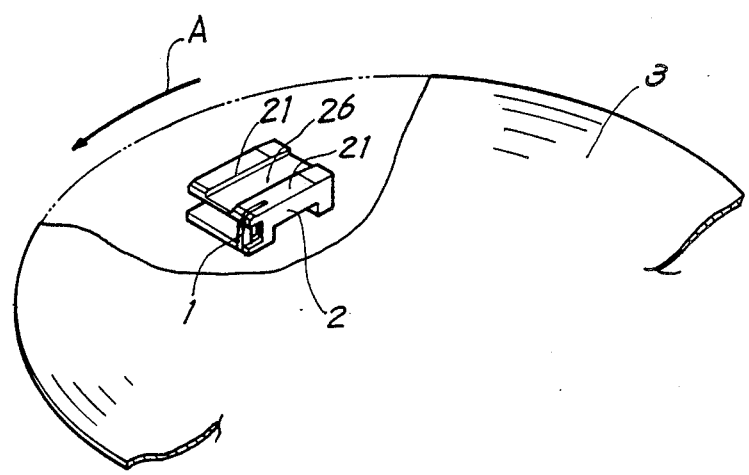
FIG. 2 is a perspective view partly broken away showing the magnetic head while tracing a magnetic disc.
Figure 3:
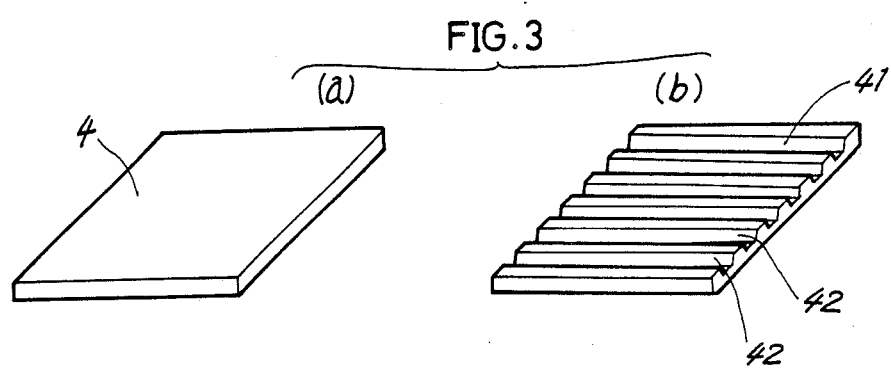

With reference to FIGS. 3 (a) and (b), first and second base plates 4, 41 of Mn-Zn single crystal ferrite are prepared, the upper and lower surfaces of the two plates are each polished to a mirror surface, and winding grooves 42 eventually forming winding apertures 14 as seen in FIG. 1 are formed at a specified pitch in the upper surface of the second base plate 41 over the entire area thereof.

Figure 4:
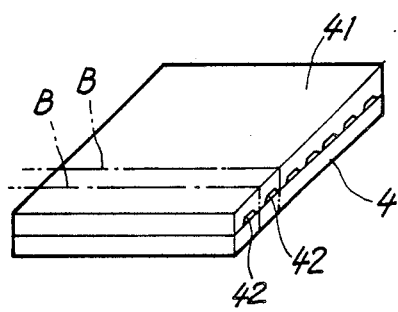

A gap spacer (indicated at 43 in FIG. 5) is provided on the upper surface of each or one of the first and second base plates 4, 41 by vacuum evaporation or sputtering, and the two base plates 4, 41 are placed over each other with the gap spacer interposed therebetween as shown in FIG. 4.

Figure 5:
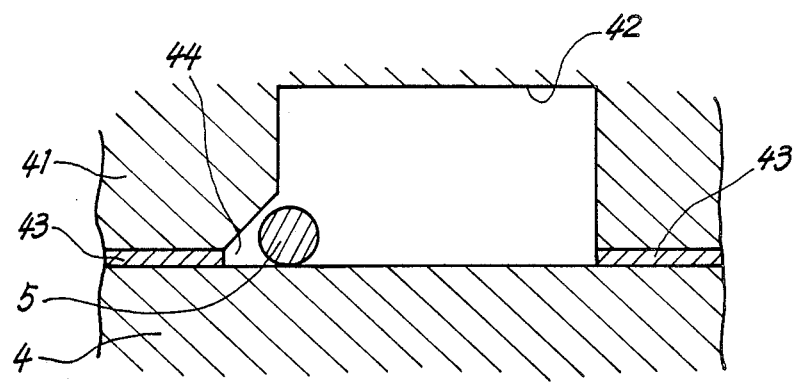
Figure 6:
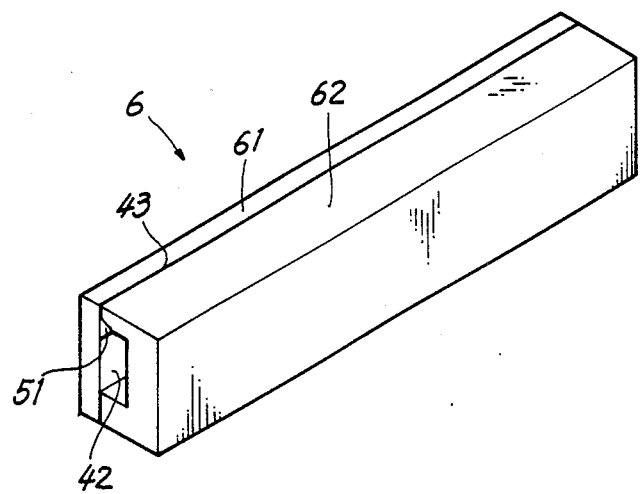

As shown in FIG. 5, a glass rod 5 having a softening point temperature of 580° C. is inserted into each winding groove 42 and then heated at 780° C. in an oven for melting with the two base plates pressed against each other. The molten glass fuses in a corner portion 44 of each winding groove 42 to bond the first base plate 4 to the second base plate 41.

The assembly of bonded first and second plates 4, 41 is thereafter cut along broken lines B in FIG. 4 into core blocks 6 each having the winding groove 42 as seen in FIG. 4. The core block 6 comprises a pair of block segments 61, 62 with the gap spacer 43 provided at the joint therebetween and has a bonding glass portion 51 afforded by the fused glass rod and giving bond strength to the block segments.

Figure 7:
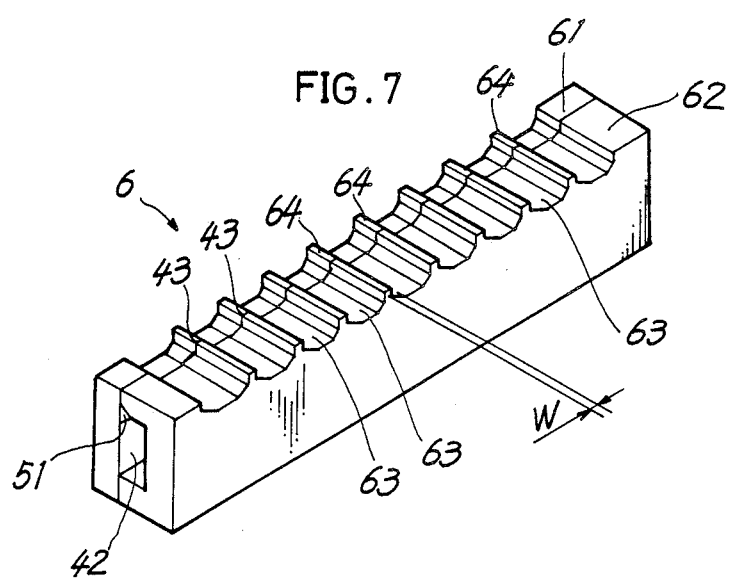

With reference to FIG. 7, track width defining grooves 63 are formed at a specified pitch in the upper surface of the core block 6 to thereby form a multiplicity of medium opposed portions 64 in the form of ridges and having a width equal to the track width W.

Figure 8:
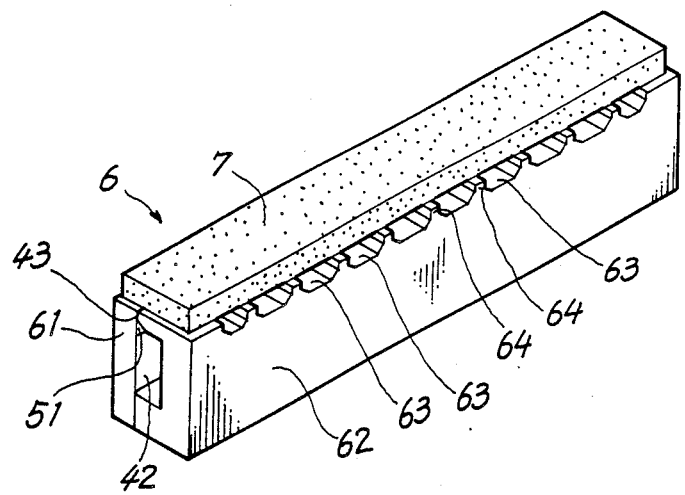

As shown in FIG. 8, a glass plate 7 having a softening point temperature of 450° C. is placed on the grooved surface of the core block 6 and heated at 520° C. in an oven.

Figure 9:
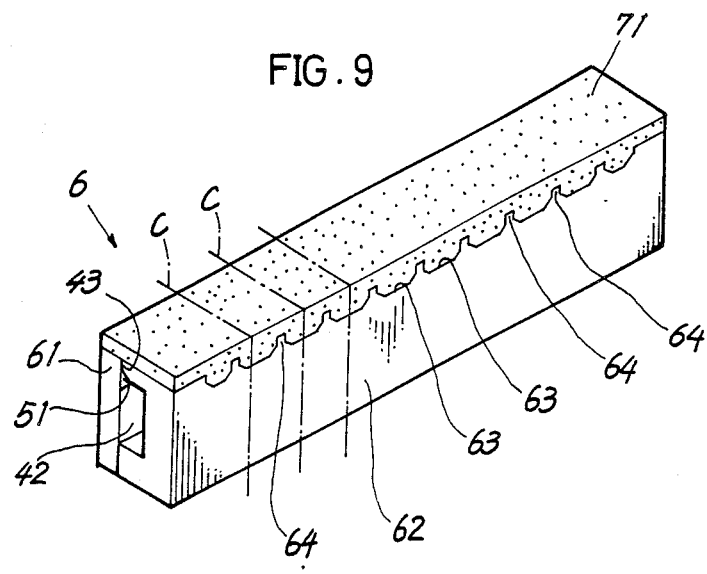
Figure 10:
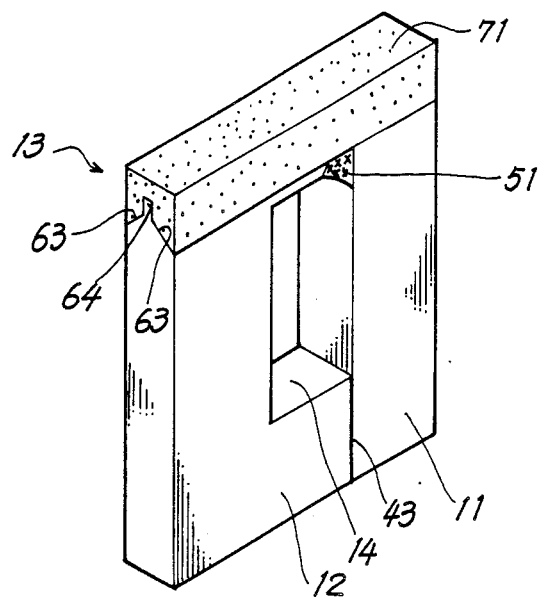

Consequently, the molten glass fills up the grooves 63, forming a glass layer 71 over the entire upper surface of the core block 6 as shown in FIG. 9. The core block 6 is then cut along lines C shown into a multiplicity of core chips 13 each having the medium opposed portion 64 as seen in FIG. 10.

The core chip 13 comprises first and second core segments 11 and 12 which are bonded together by the glass portion 51, and the second segment 12 has a winding aperture 14 centrally thereof. The medium opposed portion 64 is entirely covered with the glass layer 71 for protection.

Assembling Core and Slider Chips

Figure 11:
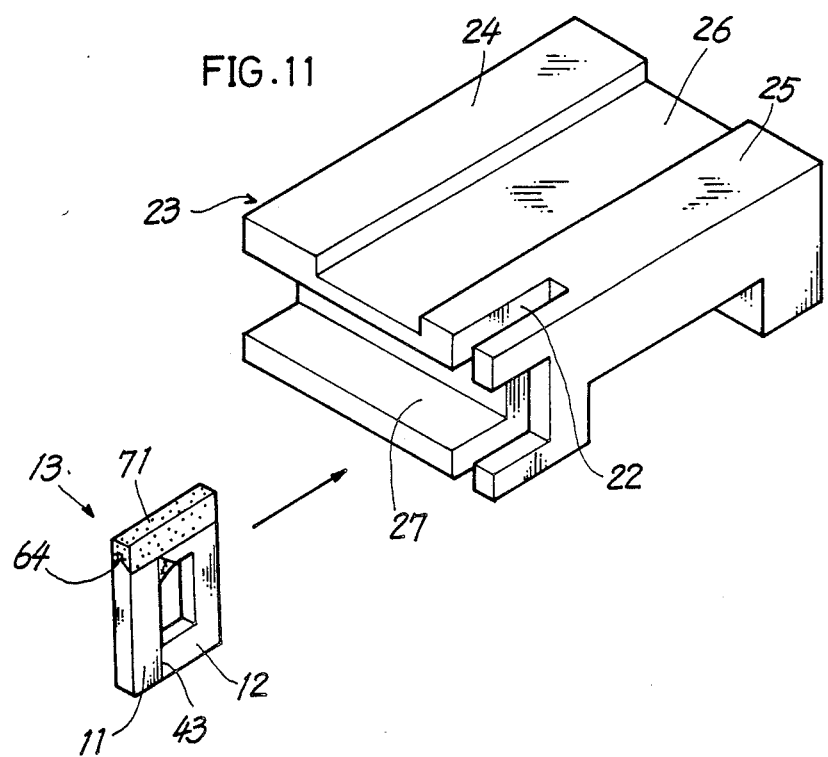

With reference to FIG. 11, a slider chip 23 having the same configuration as in the prior art is prepared. The core chip 13 obtained by the preceding step is fitted into a core accommodating groove 22 in the slider chip 23 as shown in FIG. 12.

Figure 13A:
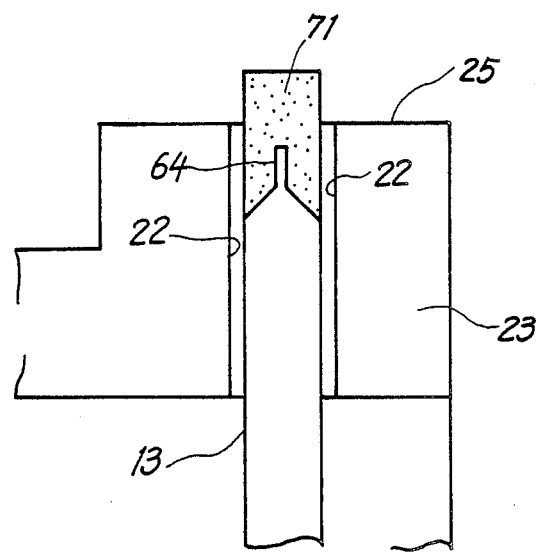
FIG. 13A is an enlarged fragmentary view showing the core chip as fitted in the slider chip.

At this time, the core chip 13 is set in position with the top of the glass layer 71 slightly projected beyond the upper surface of the slider chip 23 as seen in FIG. 13A. The thickness of the glass plate 7 shown in FIG. 8 is so determined that the volume of the projection of the glass layer 71 beyond the slider chip upper surface is greater than the volume of the clearance in the groove 22 around the core chip 13.

Melting Glass Layer

Figure 12:
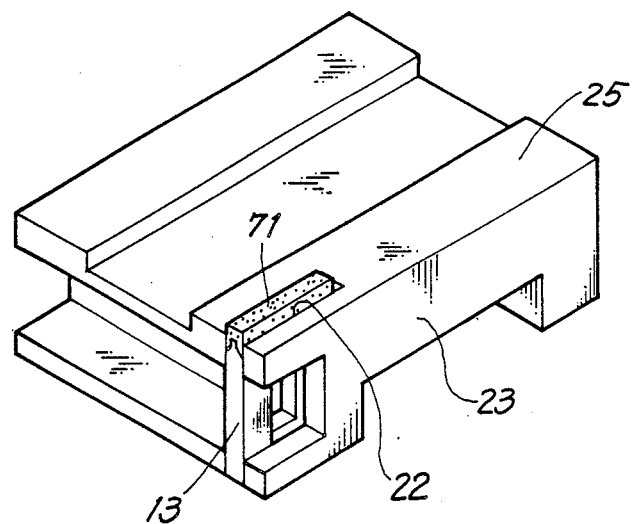

The assembly of the core chip 13 and the slider chip 23 shown in FIG. 12 is heated at 520° C. in an oven to melt the glass layer 71. Consequently, the molten glass 73 fills up the narrow clearances between the opposite side surfaces of the core chip 13 and the groove 22 defining inner surfaces of the slider chip 23 without creating any void therein as seen in FIG. 14.

Grinding

Figure 14:
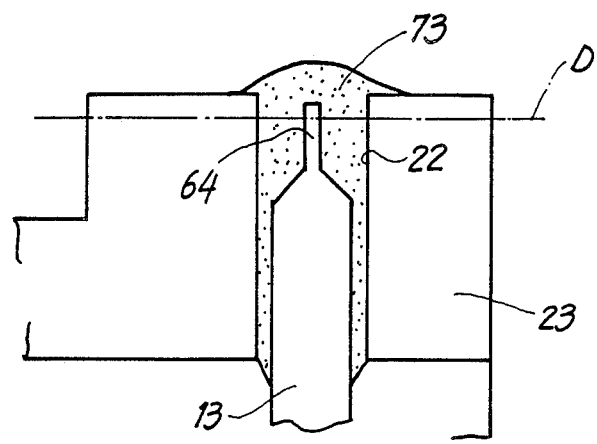

After the molten glass 73 has been solidified by cooling, the assembly is ground to a level indicated by the broken line D in FIG. 14, and the projections 24, 25 of the slider chip 23 are chamfered as required, whereby the core chip 13 is made into a head core 1 and the slider chip 23 into a slider 2. Thus, the magnetic head of the floating type shown in FIG. 1 is completed.

Figure 13B:
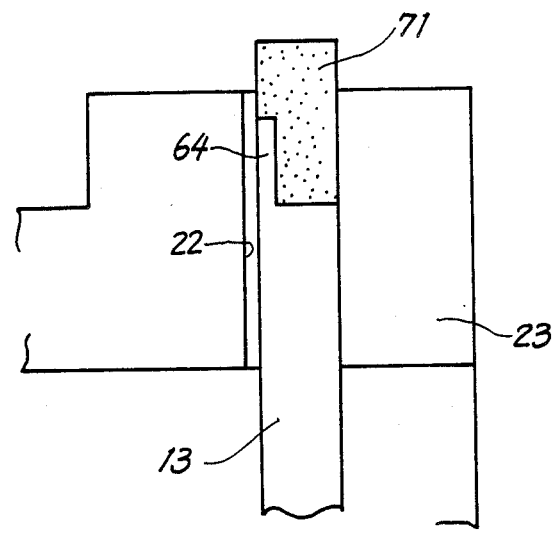
FIG. 13B is a view similar to FIG. 13A and showing a core chip with a medium opposed portion of different shape.

The medium opposed portion 64 of the core chip 13 can be formed as positioned toward one side of the chip as shown in FIG. 13B. In this case, the glass layer 71 is melted with the core chip 13 held in intimate contact with one inner surface of the slider chip 23 defining the core accommodating groove 22.

With the production process described above, the glass layer 71 of the core chip 13 shown in FIG. 10 is formed by the single glass plate 7 on melting as seen in FIGS. 8 and 9. Although slender glass rods are prepared and then placed in the track width defining grooves in the prior art, the present process eliminates the need for such a cumbersome procedure and is therefore exceedingly higher in productivity and work efficiency.

The medium opposed portion 64 of the core chip 13, which is covered with the glass layer 71, is unlikely to collide directly with the slider chip 23 and is therefore precluded from chipping or developing other faults when the core chip 13 is fitted into the groove 22 of the slider chip 23 as shown in FIG. 11. This achieves a remarkably improved yield over the conventional methods.

Second Embodiment

With floating-type magnetic heads, the glass filled portion 15 of the head core 1 is left exposed at the medium opposed face 21 as seen in FIG. 1, so that it is desirable to use glass having a high softening point temperature which has high weather resistance as the material for the glass filled portion. However, to fully soften the glass layer by the melting step shown in FIG. 14, the glass layer must be heated at a sufficiently high temperature in this case, with the result that the bonding glass portion 51 of the core chip 13 becomes softened at the high temperature to exhibit reduced bond strength, possibly displacing the core segments 11, 12 from each other. This displacement impairs the accuracy of the configuration of the magnetic gap portion.

Accordingly, the present embodiment includes the steps shown in FIGS. 15 to 18, such that glass of low softening point temperature is used for the lower layer of the glass filled portion of the head core 1, with glass of high softening point temperature used for the upper layer thereof to give improved weather resistance to the glass filled portion 15.

Figure 15:
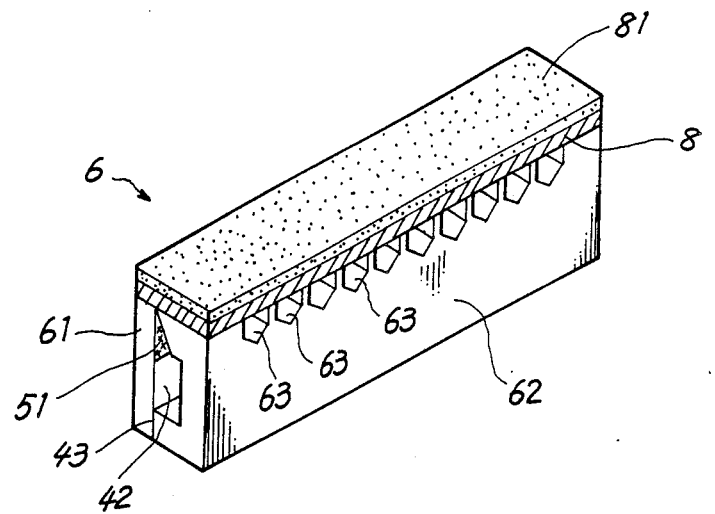
FIGS. 15 to 18 show stepwise another process for producing a magnetic head as a second embodiment of the invention.

With reference to FIG. 15, the core block 6 prepared by the steps of FIGS. 3 to 7 has placed thereon a glass plate 8 having a softening point of 400° C., and a glass plate 81 with a softening point of 470° C. is further placed over the glass plate 8. The glass plates are then heated to 530° C. in an oven, maintained at this temperature for 10 minutes and thereafter cooled. Since the bonding glass portion 51 has a softening point of 580° C., the heating does not impair the bond strength of the block segments 61, 62.

The heat treatment first melts the glass plate 8 of low softening point temperature, permitting the melt to flow into the track width defining grooves 63 in the core block 6. The glass plate 81 of high softening point temperature thereafter softens and partly flows into the upper portions of the grooves 63, and the remaining portion of the glass covers the entire upper surface of the block 6 (see FIG. 16).

Figure 16:
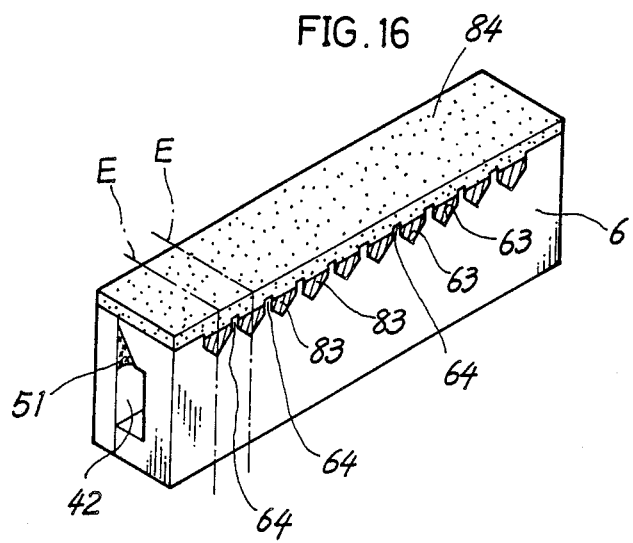

Consequently, a glass layer 83 of low softening point temperature is formed at the bottom of each groove 63 of the block 6, and a glass layer 84 of high softening point temperature at the upper portion of the groove 63 and over the block 6 as seen in FIG. 16.

Figure 17:
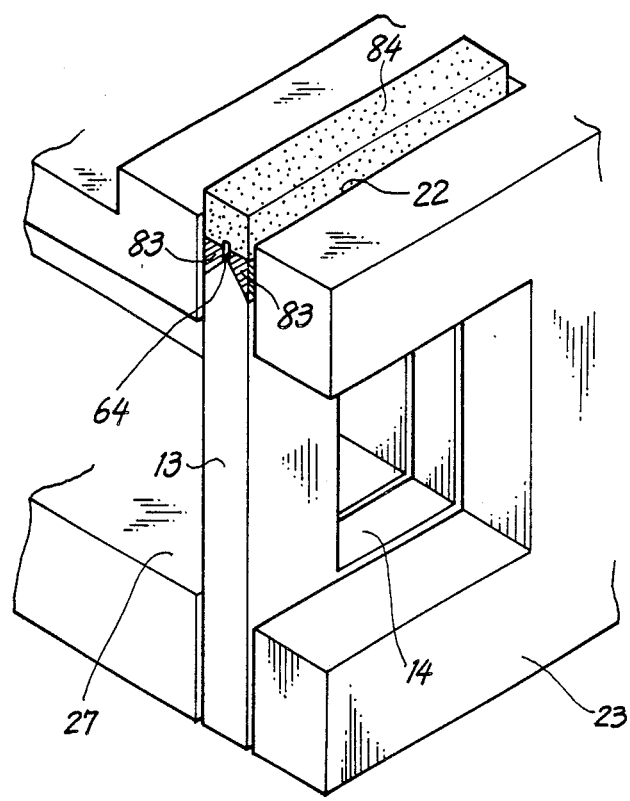

The core block 6 is thereafter cut along broken lines E in FIG. 16 into core chips 13 each having the medium opposed portion 64 as seen in FIG. 17. The core chip 13 is fitted into a core accommodating groove 22 in a slider chip 23 as illustrated. The assembly of chips 13, 23 is then heated at 530° C. in an oven, maintained at this temperature for 10 minutes and thereafter cooled.

This heat treatment completely melts the glass layer 83 of low softening point temperature, permitting the melt to penetrate into the narrow clearances between the opposite side surfaces of the core chip 13 and the groove 22 defining inner surfaces of the slider chip 23. The glass layer 84 of high softening point temperature softens, filling up the upper space of the groove 22 with the flow of the molten glass of high softening point temperature (see FIG. 18).

Consequently, the core chip 13 is firmly bonded to the slider chip 23.

Figure 18:
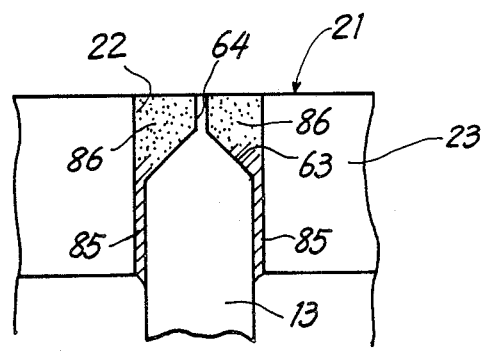
Figure 19:
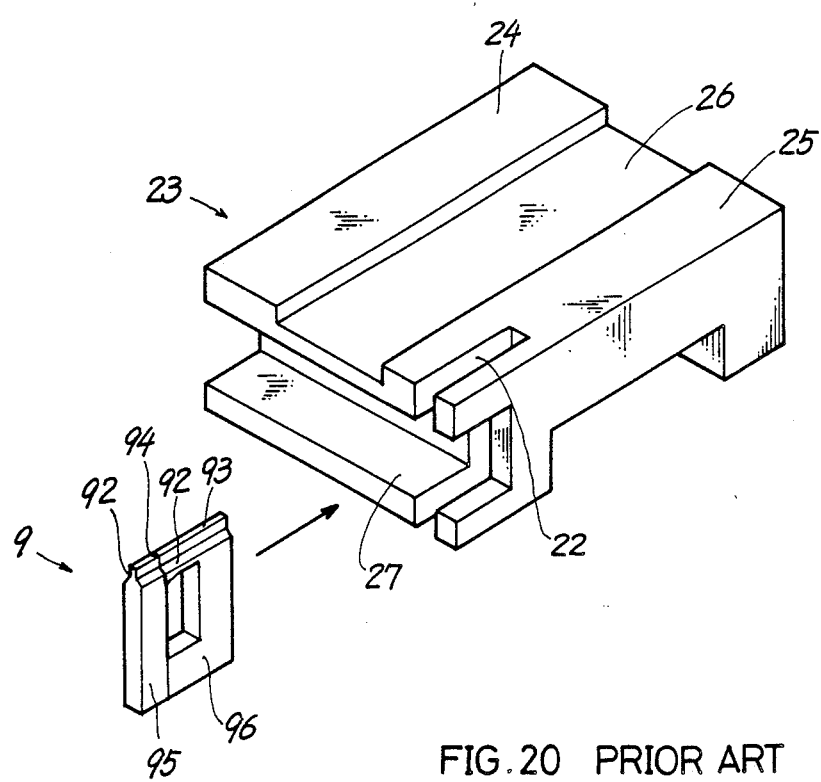
FIG. 19 is a perspective view showing a core chip and a slider chip before assembly in a conventional process for producing a magnetic head.
Figure 20:
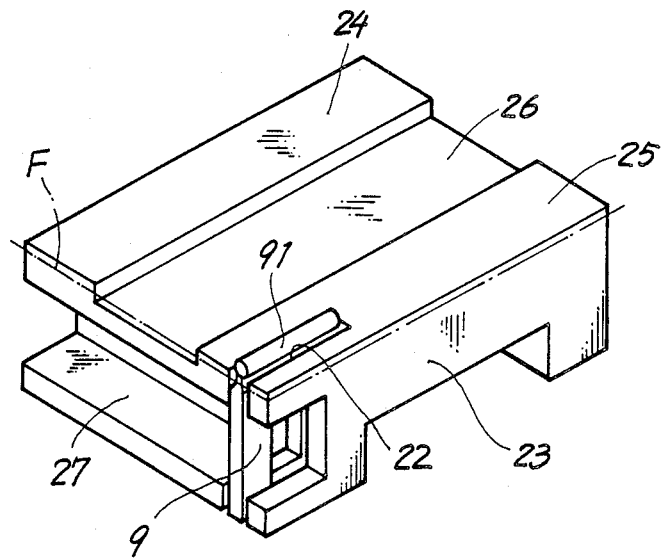
FIG. 20 is a perspective view showing the chips as assembled.
Figure 21:
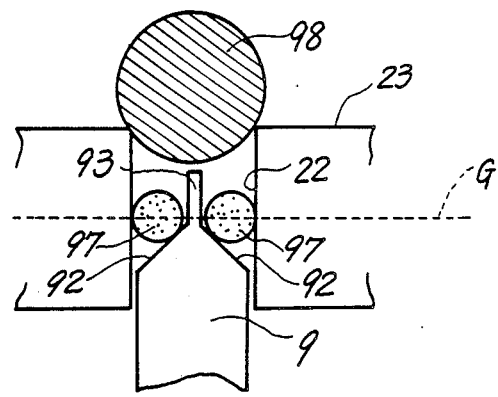
FIG. 21 is an enlarged fragmentary view showing a core chip and a slider chip before melting and grinding in another conventional magnetic head production process.
Figure 22:
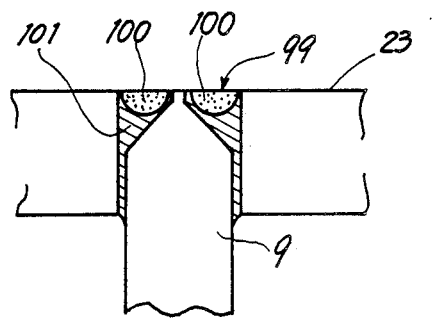
FIG. 22 is an enlarged front view showing the same after melting and grinding.

The assembly is subsequently ground in the same manner as in FIG. 14 to form a medium opposed face 21 as shown in FIG. 18. As a result, a glass filled portion 85 of low softening point temperature is formed in the lower half of the clearance in the core accommodating groove 22 around the core chip 13, and a glass filled portion 86 of high softening point temperature in the clearance upper half. The glass filled portion 86 of high softening point temperature only is left exposed at the medium opposed face 21. Thus, the face 21 is highly planar and free of the step which is created in the head of the prior art.

Even when the medium opposed face 21, shown in FIG. 1, of the head thus fabricated is exposed, for example, to moisture, the exposed surface of the glass filled portion 15 made of the glass of high softening point temperature exhibits high weather resistance, enabling the head to exhibit the specified performance over a prolonged period of time.

Since the steps shown in FIGS. 15 to 18 are adapted to melt the glass of low softening point temperature at a relatively low heating temperature to bond the core chip to the slider chip, this melting procedure will not impair the bond strength between the pair of core segments constituting the core chip. Consequently, the magnetic head eventually obtained is free from deflects errors in the configuration of its magnetic gap portion. This results in an exceedingly higher yield than heretofore possible.

The second embodiment of course has the same advantages as the first embodiment. As seen in FIGS. 15 and 16, the track width defining grooves 63 can be filled with glass at the same time by melting the glass plates 8, 81 placed on the upper surface of the core block 6. This method achieves improvements in productivity and work efficiency over the conventional method wherein glass rods are used. Further since the medium opposed portion 64 of the core chip 13 is covered with the glass layers 83, 84, this portion 64 remains free of damage, for example, due to collision with the slider chip 23 when the core chip 13 is fitted into the groove 22 of the slider as shown in FIG. 17.

The production processes of the foregoing first and second embodiments are of course useful for producing magnetic heads of the so-called metal-in-gap type wherein a thin film of highly magnetic metal such as Sendust is provided at one or each side of the magnetic gap portion of the head core 1 (see, for example, Unexamined Japanese Publication SHO Pat. No. 62-295207).

The drawings and the above description of the embodiments are intended for the illustration of the invention and should not be interpreted as limiting the invention as defined in the appended claims or restricting the scope thereof.

The process of the invention is not limited to the foregoing embodiments but can be modified variously by one skilled in the art without departing from the spirit of the invention.

For example, although two glass layers are used in the embodiment of FIGS. 15 to 18, a multilayer structure comprising at least three layers is usable.

What is claimed is:

1. A process for producing a magnetic core of the floating type by fitting a head core with a magnetic gap portion into a core accommodating groove in a slider having a face to be opposed to a magnetic recording medium, and securing the head core to the slider by a glass filled portion formed in a clearance within the groove around the head core, the process comprising the steps of:
   (a) preparing a core chip comprising a pair of core segments butting on each other with a gap spacer formed therebetween to provide a magnetic gap portion, the core chip having a medium opposed portion of a small width extending over the pair of core segments, this step including forming a glass layer on the core chip covering the medium opposed portion,
   (b) fitting the core chip prepared by the first step into a core accommodating groove formed in a slider chip,
   (c) bonding the core chip to the slider chip by melting the glass layer formed on the core chip to fill the molten glass into a clearance within the core accommodating groove around the core chip, and
   (d) machining the resulting assembly of slider chip and core chip to form the face to be opposed to the magnetic recording medium.

2. A process as defined in claim 1 wherein the step of preparing the core chip comprises:
   (a) preparing a core block by joining a pair of block segments together with a gap spacer formed therebetween,
   (b) forming track width defining grooves in the core block at a specified pith to thereby form a plurality of medium opposed portions each having a width in accordance with the track width,
   (c) forming a glass layer in the track width defining grooves and over the medium opposed portions by placing a glass plate on the medium opposed portions and melting the glass plate by heating, and
   (d) cutting the resulting core block into core chips each having a medium opposed portion.

3. A process for producing a magnetic core of the floating type by fitting a head core with a magnetic gap portion into a core accommodating groove in a slider having a face to be opposed to a magnetic recording medium, and securing the head core to the slider by a glass filled portion formed in a clearance within the groove around the head core, the process comprising the steps of:

(a) preparing a core chip comprising a pair of core segments butting on each other with a gap spacer formed therebetween to provide a magnetic gap portion, the core chip having a medium opposed portion of a small width extending over the pair of core segments, this step including forming glass layers on the core chip over the medium opposed portion, said layers having progressively rising softening point temperatures, upwardly from layer to layer, (b) fitting the core chip prepared by the first step into a core accommodating groove formed in a slider chip, (c) bonding the core chip to the slider chip by melting only the glass layers previously formed on the core chip to fill the molten glass into a clearance within the core accommodating groove around the core chip, and (d) machining the resulting assembly of slider chip and core chip to form the face to be opposed to the magnetic recording medium.

4. A process as defined in claim 3 wherein the step of preparing the core chip comprises:

(a) preparing a core block by joining a pair of block segments together with a gap spacer formed therebetween, (b) forming track width defining grooves in the core block at a specified pitch to thereby form a plurality of medium opposed portions each having a width in accordance with the track width, (c) forming glass layers having progressively rising softening point temperatures from layer to layer upwardly in the track width defining grooves and over the medium opposed portions by placing on the medium opposed portions a plurality of glass plates having progressively rising softening point temperatures from plate to plate and melting the glass plates by heating, and (d) cutting the resulting core block into core chips each having a medium opposed portion.

* * * * *